(12) United States Patent
Desai et al.

(10) Patent No.: US 11,308,235 B2
(45) Date of Patent: *Apr. 19, 2022

(54) DETECTION OF SENSITIVE PERSONAL INFORMATION IN A STORAGE DEVICE

(71) Applicant: International Business Machines Corporation, Armonk, NY (US)

(72) Inventors: Rajesh M. Desai, San Jose, CA (US); Mu Qiao, Belmont, CA (US); Roger C. Raphael, San Jose, CA (US); Ramani Routray, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 61 days.

This patent is subject to a terminal disclaimer.

(21) Appl. No.: 16/812,029

(22) Filed: Mar. 6, 2020

(65) Prior Publication Data

US 2020/0210619 A1    Jul. 2, 2020

Related U.S. Application Data

(63) Continuation of application No. 16/392,127, filed on Apr. 23, 2019, now Pat. No. 10,671,756, which is a
(Continued)

(51) Int. Cl.
*G06F 16/00* (2019.01)
*G06F 21/62* (2013.01)

(52) U.S. Cl.
CPC ................. *G06F 21/6245* (2013.01)

(58) Field of Classification Search
CPC ............ G06F 11/1458; G06F 11/1451; G06F 11/1453; G06F 11/1469; G06F 12/1009;
(Continued)

(56) References Cited

U.S. PATENT DOCUMENTS 5,758,120 A    5/1998  Kahle et al.
8,171,063 B1 *  5/2012  Janakiraman ....... G06F 16/1752
                                                707/822
(Continued)

OTHER PUBLICATIONS

List of IBM Patents or Patent Applications Treated as Related, Mar. 19, 2020, pp. 1-2.
(Continued)

*Primary Examiner* — Shyue Jiunn Hwa
(74) *Attorney, Agent, or Firm* — Robert A. Voigt, Jr.; Shackelford, Bowen, McKinley & Norton, LLP

(57) ABSTRACT

A method, system and computer program product for detecting sensitive personal information in a storage device. A block delta list containing a list of changed blocks in the storage device is processed. After identifying the changed blocks from the block delta list, a search is performed on those identified changed blocks for sensitive personal information using a character scanning technique. After identifying a changed block deemed to contain sensitive personal information, the changed block is translated from the block level to the file level using a hierarchical reverse mapping technique. By only analyzing the changed blocks to determine if they contain sensitive personal information, a lesser quantity of blocks needs to be processed in order to detect sensitive personal information in the storage device in near real-time. In this manner, sensitive personal information is detected in the storage device using fewer computing resources in a shorter amount of time.

20 Claims, 5 Drawing Sheets

Related U.S. Application Data continuation of application No. 15/789,525, filed on Oct. 20, 2017, now Pat. No. 10,671,754.

(58) Field of Classification Search
CPC .. G06F 12/1027; G06F 16/11; G06F 16/1748; G06F 16/1752; G06F 16/188; G06F 2201/815; G06F 3/0617; G06F 3/065; G06F 3/068; G06F 12/1036; G06F 12/0833; G06F 12/0882; G06F 2212/1008; G06F 2212/152; G06F 2212/608; G06F 2212/657; G06F 2212/682; G06F 3/0619; G06F 3/0673; G06F 12/1045; G06F 12/1072; G06F 12/0808; G06F 12/0815; G06F 12/10; G06F 2212/452; G06F 2212/62; G06F 3/0611; G06F 9/30087; G06F 21/6245; G06F 11/3006; G06F 11/3072; G06F 11/3082; G06F 11/3409; G06F 11/3476; G06F 16/148; G06F 16/185; G06F 16/2423; G06F 16/245; G06F 16/2452; G06F 16/24522; G06F 16/2453; G06F 16/2455; G06F 16/2468; G06F 16/2477; G06F 16/248; G06F 16/258; G06F 16/283; G06F 16/284; G06F 16/31; G06F 16/3329; G06F 16/3331; G06F 16/3337; G06F 16/334; G06F 16/335; G06F 16/338; G06F 16/36; G06F 16/383; G06F 16/43; G06F 16/86; G06F 16/9024; G06F 16/9032; G06F 16/90335; G06F 16/90344; G06F 16/951; G06F 16/9535; G06F 21/552; G06F 2216/03; G06F 40/106; G06F 40/126; G06F 40/146; G06F 40/205
See application file for complete search history.

(56) References Cited

U.S. PATENT DOCUMENTS

| | | | |
|---|---|---|---|
| 8,386,733 B1* | 2/2013 | Tsaur | G06F 16/11 711/163 |
| 8,849,769 B1* | 9/2014 | Xing | G06F 16/188 707/674 |
| 9,477,784 B1* | 10/2016 | Bhave | G06F 16/9024 |
| 2003/0182325 A1* | 9/2003 | Manley | G06F 11/2074 |
| 2010/0077013 A1 | 3/2010 | Clements et al. | |
| 2016/0078104 A1* | 3/2016 | Clifford | G06F 3/04842 707/722 |

OTHER PUBLICATIONS

Princy et al., "Privacy Preserving Data Analysis in Mental Health Research Using Cloud Computation," International Journal of Computer Science Trends and Technology, vol. 5, Issue 2, Mar.-Apr. 2017, pp. 81-85.

Chuck Patch, "Email Archiving Stewardship Tools Workshop," Harvard Library Report, Jul. 2016, pp. 1-75.

Korba et al., "Private Data Discovery for Privacy Compliance in Collaborative Environments," Cooperative Design, Visualization and Engineering, 2008, pp. 142-150.

* cited by examiner

DETECTION OF SENSITIVE PERSONAL INFORMATION IN A STORAGE DEVICE

TECHNICAL FIELD

The present invention relates generally to detecting sensitive personal information, and more particularly to detecting sensitive personal information in a storage device by identifying changed blocks containing sensitive personal information using a character scanning technique (e.g., regular expression) and then translating those blocks from a block level to a file level using a hierarchical reverse mapping technique to identify file objects that are deemed to contain sensitive personal information.

BACKGROUND

Currently, sensitive personal information (also referred to as personally identifiable information) is detected in a storage device in near real-time via textual processing of the files in a file system for the storage device. Sensitive personal information, as used herein, refers to information (e.g., financial and health information, social security numbers, data about children, geolocation data) that can be used on its own or with other information to identify, contact or locate a single person or to identify an individual in context. A file is technically defined as an ordered set of characters implemented over a block device. A file then is a collection of extents, with each extent corresponding to a contiguous set of blocks, obtained from a block device (also referred to as a logical unit number (LUN)). A block is a contiguous set of bits or bytes that forms an identifiable unit of data. Since sensitive personal information is detected in the storage device in near real-time via textual processing of the files at the file layer, all of the blocks associated with those files are also processed. As a result, a large quantity of blocks are being processed in order to detect sensitive personal information in the storage device in near real-time. The system needs to detect sensitive personal information at the file layer since the end user (or other consumer) is usually only interested in that level of granularity of detection.

Hence, the common approach to detecting sensitive personal information involves detecting sensitive personal information at a file by file level leading to large amounts of data being processed even for small changes within a file, perhaps spanning a single block. By processing a large quantity of blocks, an inordinate amount of computing resources is being utilized to detect sensitive personal information. Furthermore, by processing a large quantity of blocks, it increases the time in detecting sensitive personal information.

SUMMARY

In one embodiment of the present invention, a method for detecting sensitive personal information in a storage device comprises processing a block delta list, where the block delta list is a list of changed blocks in a storage device, and where the block delta list includes deltas associated with the changed blocks that indicate differences in the changed blocks from a first point of time to a second point of time. The method further comprises identifying changed blocks from the block delta list. The method additionally comprises searching the identified changed blocks for sensitive personal information using a character scanning technique. Furthermore, the method comprises identifying a changed block deemed to contain the sensitive personal information. Additionally, the method comprises translating the identified changed block from a block level to a file level using a hierarchical reverse mapping technique.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for detecting sensitive personal information in a storage device. In one embodiment of the present invention, a block delta list containing a list of changed blocks in the storage device is processed. A block delta list is a list of changed blocks as well as the deltas (differences in the block from a first point of time to a second point of time) associated with those changed blocks. A changed block refers to a block (contiguous set of bits or bytes that forms an identified unit of data) whose identifiable unit of data has changed over a period of time. For example, a block may have changed due to the storing of sensitive personal information. After identifying the changed blocks from the block delta list, a search is performed on those identified changed blocks for sensitive personal information using a character scanning technique, such as regular expression. "Regular expression," as used herein, refers to a sequence of characters (metacharacters and/or regular characters) that define a search pattern. After identifying a changed block deemed to contain sensitive personal information, the changed block is translated from the block level to the file level using a hierarchical reverse mapping technique. Such a translation is made so as to identify the file on the file level containing the sensitive personal information. In one embodiment, the hierarchical reverse mapping technique uses block level translations and file system inode translations. By only analyzing the changed blocks to determine if they contain sensitive personal information as opposed to analyzing the files at the file layer, including all of the blocks associated with those files, a lesser quantity of blocks needs to be processed in order to detect sensitive personal information in the storage device in near real-time. In this manner, a lesser amount of computing resources needs to be utilized to detect sensitive personal information. Furthermore, the processing time in detecting sensitive personal information is reduced.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
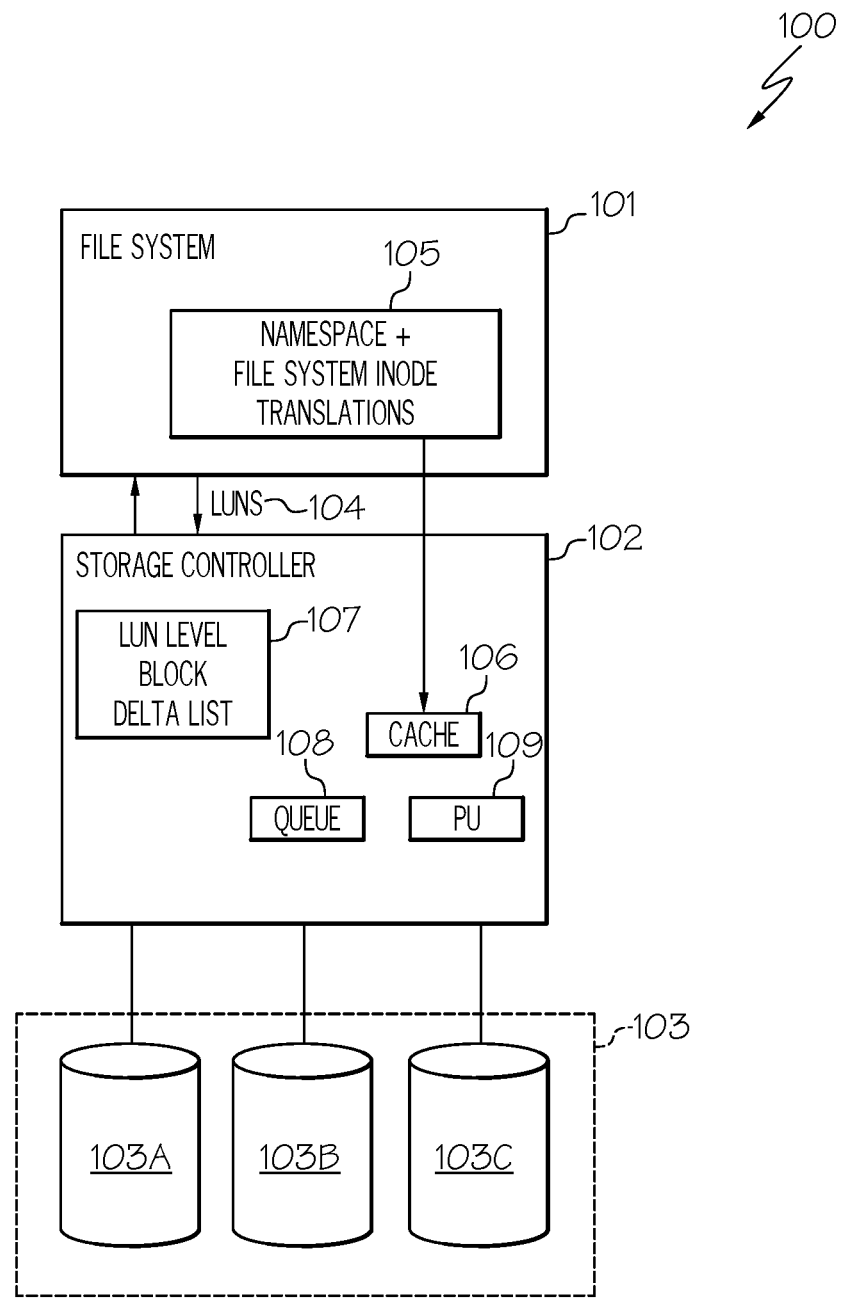
FIG. 1 illustrates a storage system configured in accordance with an embodiment of the present invention.

Referring now to the Figures in detail, FIG. 1 illustrates a storage system 100 for practicing the principles of the present invention in accordance with an embodiment of the present invention. Storage system 100 includes a file system 101, which is used to control how data is stored and retrieved. Storage system 100 further includes a storage controller 102, which may be physical or virtual. Storage controller 102 is configured to control the storing of data in storage devices 103A-103C, which may be physical or virtual, connected to storage controller 102. Storage devices 103A-103C may collectively or individually be referred to as storage devices 103 or storage device 103, respectively.

In connection with controlling the storing of data in storage devices 103, file system 101 and storage controller 102 communicate the logical unit numbers (LUNS) 104 between each other, where a LUN is a unique identifier for designating an individual or collection of physical or virtual storage devices 103. In this manner, the particular storage device 103 may be easily identified.

Furthermore, a namespace, which refers to a set of symbols that is used to organize objects so that these objects may be referred to by a name, may be communicated to storage controller 102 from file system 101, to identify files assigned to that name. Also, an inode of file system 101 is a data structure that describes a file system object, such as a file. The file system inode translations, which include the attributes (e.g., metadata, such as time of last change, access, modification) and block locations of the file's data, is communicated to storage controller 102 to assist in the translation of a block from the block level to the file level. The namespace and file system inode translations are shown in element 105 of file system 101. Such information 105 may be stored in a cache 106 in storage controller 102.

Furthermore, storage controller 102 may store a LUN level block delta list 107 containing a list of changed blocks, where a changed block refers to a block (contiguous set of bits or bytes that forms an identified unit of data) whose identifiable unit of data has changed over a period of time. For example, a block may have changed due to the storing of sensitive personal information. These changed blocks may then be analyzed to determine if they contain sensitive personal information, such as by using a character scanning technique, as discussed below. By only analyzing these changed blocks to determine if they contain sensitive personal information as opposed to analyzing the files at the file layer, including all of the blocks associated with those files, a lesser quantity of blocks needs to be processed in order to detect sensitive personal information in storage device 103 in near real-time. In one embodiment, prior to the point in time in analyzing the changed blocks, it has been previously determined whether the blocks contain sensitive personal information. As a result, only the changed blocks are of interest to determine if they contain sensitive personal information. In this manner, a lesser amount of computing resources needs to be utilized to detect sensitive personal information. Furthermore, the processing time in detecting sensitive personal information is reduced. Hence, there is an improvement of computer efficiency thereby improving the functionality of computing systems. That is, the present invention provides a technical solution to the technical problem of using an inordinate amount of computing resources and time in detecting sensitive personal information in storage devices.

Furthermore, as shown in FIG. 1, storage controller 102 includes a queue 108 for storing a block delta list that is later processed by storage controller 102, such as by processing unit (PU) 109.

Furthermore, FIG. 1 is not to be limited in scope to the number of depicted elements. For example, while FIG. 1 illustrates a single PU 109, storage controller 102 may utilize any number of processing units (e.g., graphical processing units). In another example, while FIG. 1 illustrates a single file system 101, storage system 100 may include any number of file systems 101, including different types of file systems.

Figure 3:
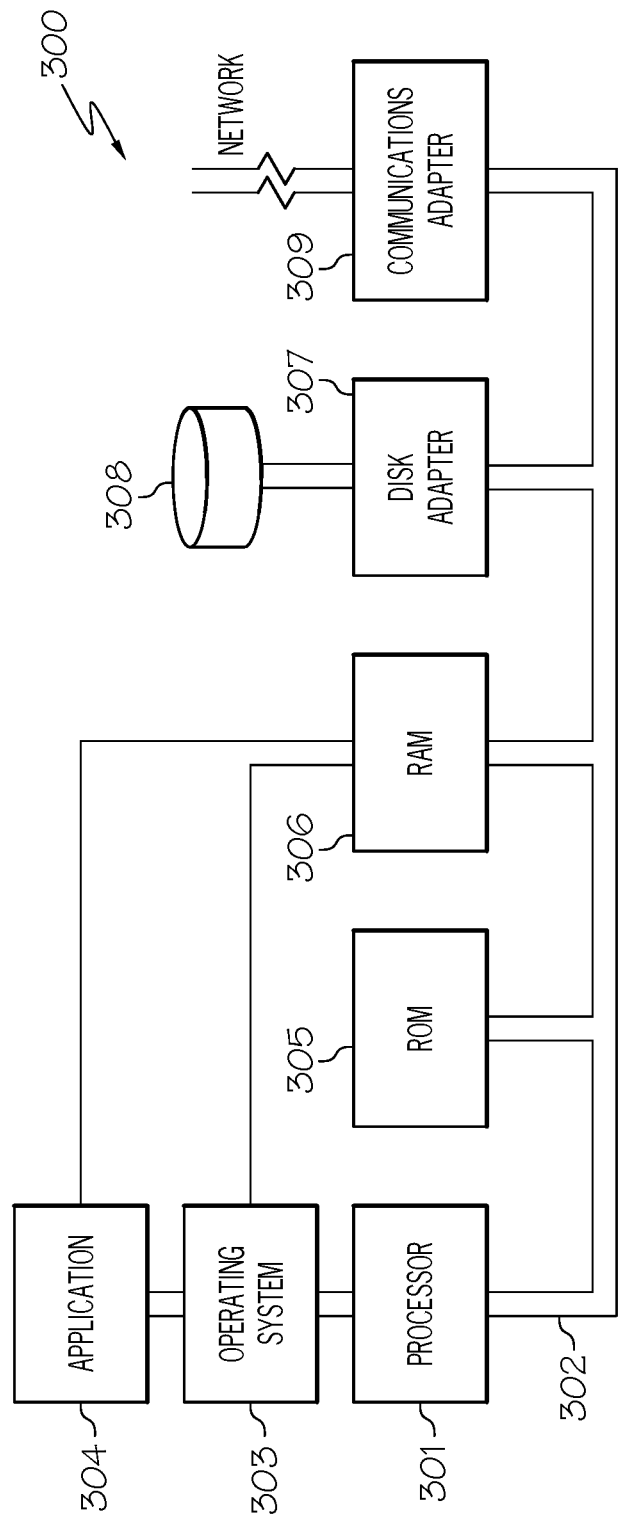
FIG. 3 illustrates an embodiment of the present invention of a hardware configuration of a computing system which is representative of a hardware environment for practicing the present invention.

In one embodiment, storage system 100, including file system 101 and storage controller 102, may reside on a computing system, such as shown in FIG. 3. In one embodiment, file system 101 is a part of the operating system. In another embodiment, file system 101 refers to the hardware used for nonvolatile storage, the software application that controls the hardware or the architecture of both the hardware and software. In one embodiment, storage controller 102 may be a virtualized storage controller, such as having its operations executed by a virtual machine which is run by a hypervisor, which may be implemented in microcode running on the processor or it may be implemented in software as part of a virtual operating system.

Figure 2:
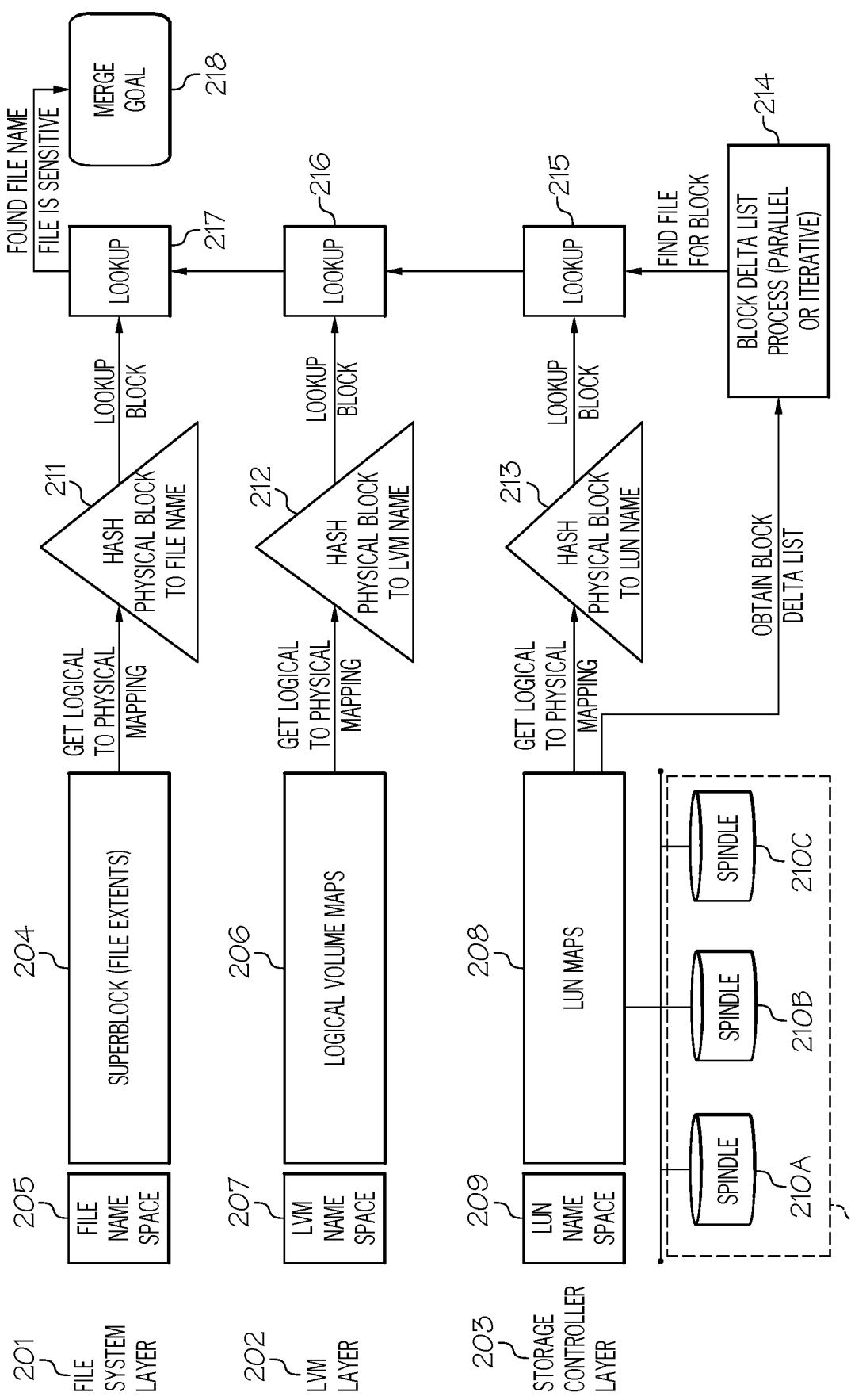
FIG. 2 illustrates the reverse map lookup data structure to arbitrarily look-up a physical block number in a logical unit number (LUN) to obtain a file name in the name space of the file system at the top of the software stack in accordance with an embodiment of the present invention.

Furthermore, in one embodiment, the present invention utilizes a data structure as shown in FIG. 2, referred to herein as the "reverse map lookup data structure," to arbitrarily look-up a physical block number in a LUN to obtain a file name in the name space of the file system at the top of the software stack. In this manner, one is able to locate the files that have sensitive personal information in the ever changing file system sitting on top of the physical storage LUN.

In one embodiment, the storage hierarchy of the reverse map lookup data structure may consist of multiple layers, such as the file system layer 201, the logical volume manager (LVM) layer 202 and the storage controller layer 203 as shown in FIG. 2.

Referring to FIG. 2, in conjunction with FIG. 1, in one embodiment, each layer 201, 202, 203 exposes a logical layer and an underlying physical layer upon which the logical layer is built.

As illustrated in FIG. 2, file system layer 201 includes the file extents 204 ("superblock") and the file name space 205 (previously discussed above in connection with element 105).

As further illustrated in FIG. 2, LVM layer 202 includes the logical volume mappings ("Logical Volume Maps") 206, such as the mappings between the logical and physical block device names as well as the LVM name space 207.

Furthermore, as illustrated in FIG. 2, storage controller layer 203 includes the LUN mappings ("LUN Maps") 208, such as associating a LUN with an igroup, as well as the LUN name space 209.

In one embodiment, storage controller layer 203 exposes the underlying physical layer of spindles (physical disk drives) 210A-210C. Spindles 210A-210C may collectively or individually be referred to as spindles 210 or spindle 210, respectively. FIG. 2 is not to be limited in scope to the depicted number of spindles 210.

In one embodiment, the logical to physical mappings are obtained from each layer 201, 202, 203, where the "physical" blocks are hashed to a file name (see 211), a LVM name (see 212) and a LUN name (see 213), respectively.

Furthermore, as shown in FIG. 2, the block delta list (see element 107 of FIG. 1) is obtained from storage controller layer 203 which is processed in parallel or iterative (see 214). The file for the block is then found by performing a lookup 215. Furthermore, the physical blocks from hash 211, 212, 213 are identified by performing lookups 215, 216, 217, respectively, where the information from lookup 215 is used to perform lookup 216, and the information from lookup 216 is used to perform lookup 217.

The result of lookup 217 is identifying file names containing sensitive personal information. These file names are merged 218 so that the end user can identify a set of files that contain sensitive personal information.

This list of file names at the top of the storage hierarchy containing sensitive personal information can be identified in near real-time using the principles of the present invention.

Referring to 218, in one embodiment, any change in a file object that removes sensitive personal information is detected in the same way as a block change and that block change is checked against a persisted set of physical blocks that previously had sensitive personal information. When all known sensitive blocks associated with that same file are cleaned (i.e., the sensitive personal information in the blocks associated with the same file is removed or redacted), the merge 218 will remove the marked file from the list of files (list of file names) maintained by storage system 100 known to contain sensitive personal information.

In one embodiment, if the sensitive personal information contained in a block is removed, then the block is added to a "remove list" (list of blocks to be removed). If the remove list of blocks for a file goes to zero, then the file is removed from the list of files maintained by storage system 100 known to contain sensitive personal information.

In one embodiment, storage system 100 solves the function Fname=Lookup(Block ID) at any layer of the hierarchy using block delta list 107. By solving such a function, storage system 100 hashes the physical blocks from the logical to physical mappings for each layer as it moves up the layers 203, 202 and 201 in a chain fashion. In each case, a 2-tuple of the logical name and the logical block of the layer above it are returned. In one embodiment, the hash map is based purely on the start of an extent in each layer. In one embodiment, a hash table of the starting offset of the extent is utilized as the key and the payload is the logical object name. In one embodiment, in general, the block in the lowest layer 203 does not span 2 objects/extents as it would break the functionality of storage system 100.

Referring now to FIG. 3, FIG. 3 illustrates an embodiment of the present invention of a hardware configuration of a computing system 300 which is representative of a hardware environment for practicing the present invention. Referring to FIG. 3, computing system 300 has a processor 301 coupled to various other components by system bus 302. An operating system 303 runs on processor 301 and provides control and coordinates the functions of the various components of FIG. 3. An application 304 in accordance with the principles of the present invention runs in conjunction with operating system 303 and provides calls to operating system 303 where the calls implement the various functions or services to be performed by application 304. Application 304 may include, for example, a program for detecting sensitive personal information in a storage device as discussed further below in connection with FIGS. 4-5.

Referring again to FIG. 3, read-only memory ("ROM") 305 is coupled to system bus 302 and includes a basic input/output system ("BIOS") that controls certain basic functions of computing system 300. Random access memory ("RAM") 306 and disk adapter 307 are also coupled to system bus 302. It should be noted that software components including operating system 303 and application 304 may be loaded into RAM 306, which may be computing system's 300 main memory for execution. Disk adapter 307 may be an integrated drive electronics ("IDE") adapter that communicates with a disk unit 308, e.g., disk drive. It is noted that the program for detecting sensitive personal information in a storage device, as discussed further below in connection with FIGS. 4-5, may reside in disk unit 308 or in application 304.

Computing system 300 further includes a communications adapter 309 coupled to bus 302. Communications adapter 309 interconnects bus 302 with an outside network thereby allowing computing system 300 to communicate with other devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, since sensitive personal information is detected in the storage device in near real-time via textual processing of the files at the file layer, all of the blocks associated with those files are also processed. As a result, a large quantity of blocks are being processed in order to detect sensitive personal information in the storage device in near real-time. By processing a large quantity of blocks, an inordinate amount of computing resources is being utilized to detect sensitive personal information. Furthermore, by processing a large quantity of blocks, it increases the time in detecting sensitive personal information.

Figure 4:
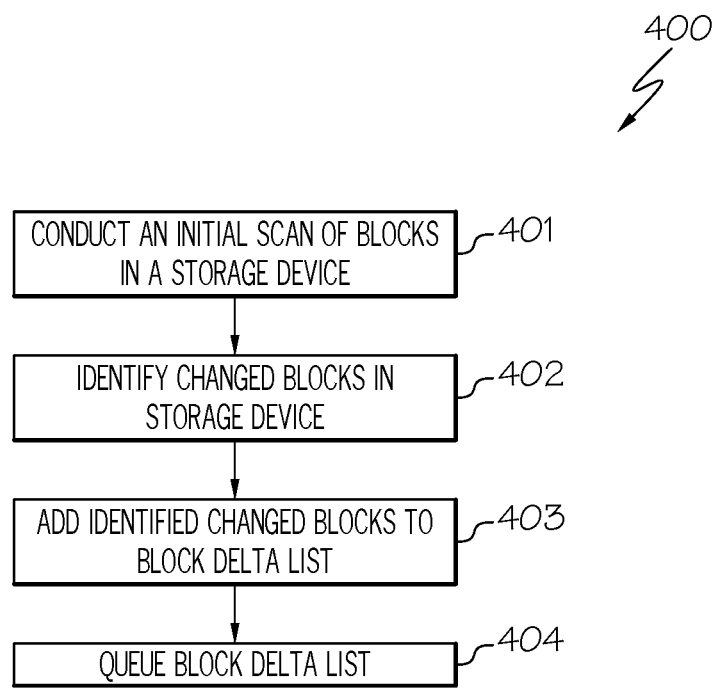
FIG. 4 is a flowchart of a method for establishing a block delta list in accordance with an embodiment of the present invention.
Figure 5:
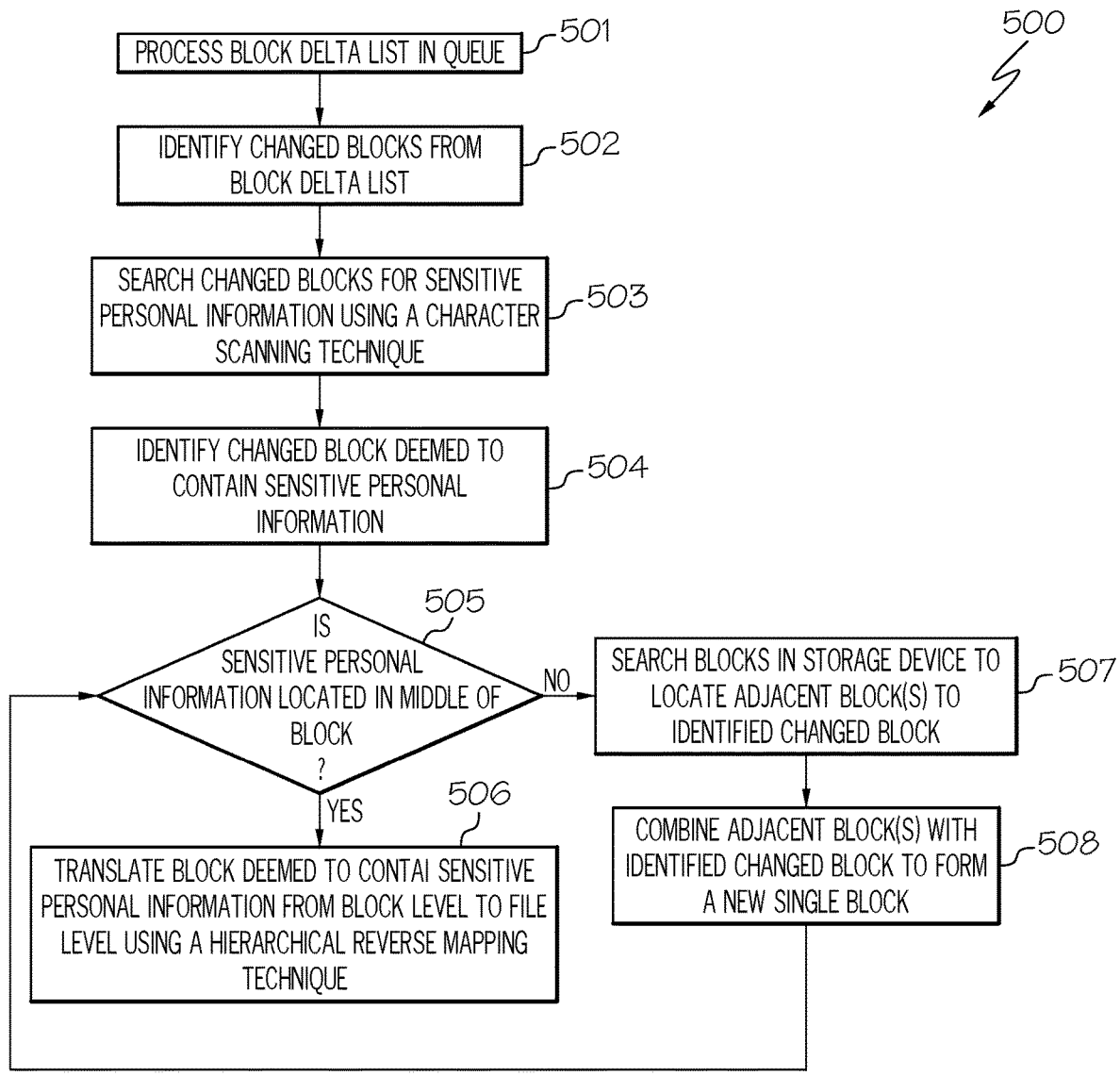
FIG. 5 is a flowchart of a method for detecting sensitive personal information in a storage device in accordance with an embodiment of the present invention.

The principles of the present invention provide a means for detecting sensitive personal information in a storage device using fewer computing resources in a shorter amount of time by identifying changed blocks containing sensitive personal information using a character scanning technique and then translating those blocks from a block level to a file level using a hierarchical reverse mapping technique as discussed below in connection with FIGS. 4-5. FIG. 4 is a flowchart of a method for establishing a block delta list. FIG. 5 is a flowchart of a method for detecting sensitive personal information in a storage device.

As stated above, FIG. 4 is a flowchart of a method 400 for establishing a block delta list in accordance with an embodiment of the present invention.

Referring to FIG. 4, in conjunction with FIGS. 1-3, in step 401, storage controller 102 conducts an initial scan of the blocks in storage device 103.

In step 402, storage controller 102 identifies any changed blocks in storage device 103. A changed block refers to a block (contiguous set of bits or bytes that forms an identified unit of data) whose identifiable unit of data has changed over a period of time. For example, a block may have changed due to the storing of sensitive personal information. In one embodiment, prior to the point in time in analyzing the changed blocks (discussed further below in connection with FIG. 5), it has been previously determined whether the blocks contain sensitive personal information. As a result, only the changed blocks are of interest to determine if they contain sensitive personal information. In one embodiment, storage controller 102 detects differences in a block from a first point of time to a second point of time and records such differences in files called deltas.

In step 403, storage controller 102 adds the identified changed block to a block delta list 107. A block delta list, as used herein, refers to a list of changed blocks. In one embodiment, such a list includes the deltas associated with those changed blocks that indicate the differences in those blocks from a first point of time to a second point of time.

In step 404, storage controller 102 queues block delta list 107 in queue 108.

Once block delta list 107 is queued in queue 108, such information may be used by storage controller 102 to determine if the changed blocks contain sensitive personal information, such as by using a character scanning technique, as discussed below in connection with FIG. 5.

FIG. 5 is a flowchart of a method 500 for detecting sensitive personal information in a storage device in accordance with an embodiment of the present invention.

Referring to FIG. 5, in conjunction with FIGS. 1-4, in step 501, storage controller 102 processes block delta list 107 in queue 108. In one embodiment, the changed blocks in the block delta list 107 are processed in parallel.

In step 502, storage controller 102 identifies the changed blocks from block delta list 107.

In step 503, storage controller 102 searches the changed blocks for sensitive personal information using a character scanning technique, such as convolutional neural network, recurrent neural network, regular expression, etc. "Regular expression," as used herein, refers to a sequence of characters (metacharacters and/or regular characters) that define a search pattern. In one embodiment, the search pattern is used by string searching algorithms for "find" operations on strings. By only analyzing the changed blocks to determine if they contain sensitive personal information as opposed to analyzing the files at the file layer, including all of the blocks associated with those files, a lesser quantity of blocks needs to be processed in order to detect sensitive personal information in storage device 103 in near real-time. In this manner, a lesser amount of computing resources needs to be utilized to detect sensitive personal information. Furthermore, the processing time in detecting sensitive personal information is reduced. Hence, there is an improvement of computer efficiency thereby improving the functionality of computing systems. That is, the present invention provides a technical solution to the technical problem of using an inordinate amount of computing resources and time in detecting sensitive personal information in storage devices.

In step 504, storage controller 102 identifies a changed block deemed to contain sensitive personal information. In one embodiment, such sensitive personal information is identified by matching the regular expression (the search pattern) with the data stored in the changed block. For example, the regular expression may include the strings of "Name" and "SSN" (SSN refers to social security number). Storage controller 102 may then search the changed blocks for those containing the strings of "Name" and "SSN." When there is a match, the changed block may be said to contain sensitive personal information.

In step 505, a determination is made by storage controller 102 as to whether the sensitive personal information is located in the middle of the identified changed block. A determination is made as to whether the sensitive personal information is located in the middle of the identified changed block in order to ensure that the changed block contains the entirety of the sensitive personal information.

If the sensitive personal information is located in the middle of the identified changed block, then, in step 506, storage controller 106 translates the changed block deemed to contain sensitive personal information from the block level to the file level using a hierarchical reverse mapping technique. Such a translation is made so as to identify the file on the file level containing the sensitive personal information. In one embodiment, the hierarchical reverse mapping technique uses block level translations and file system inode translations. The block level translations may include the attributes (e.g., metadata, such as time of last change, access, modification) and location of the block. The file system inode translations may include the attributes (e.g., metadata, such as time of last change, access, modification) and block locations of the file's data. Such information may be used by storage controller 102 to translate the changed block from a block level to a file level (e.g., particular file on a particular file system).

If, however, the sensitive personal information is not located in the middle of the identified changed block, then the sensitive personal information is located at an edge (e.g., beginning or end) of the identified changed block.

If the sensitive personal information is located at an edge of the identified changed block, then, in step 507, storage controller 102 searches the blocks in storage device 103 to locate adjacent block(s) to the identified changed block.

In step 508, storage controller 102 combines the adjacent block(s) with the identified changed block to form a new single block.

Storage controller 102 then determines whether the sensitive personal information is located at the middle of the new single block in step 505.

In one embodiment, the present invention is able to be implemented with storage systems that implement block redundancy elimination or block-level deduplication. In one embodiment, the present invention is able to be implemented with storage systems that implement block level compression and/or encryption if the necessary compression algorithm and encryption keys are made available.

Furthermore, the present invention can utilize the cloud infrastructure to detect sensitive personal information in a storage device by identifying changed blocks containing sensitive personal information using a character scanning technique and then translating those blocks from a block level to a file level using a hierarchical reverse mapping technique to identify file objects that are deemed to contain sensitive personal information. For example, storage system 100 of FIG. 1 can be implemented using the cloud infrastructure. A person of ordinary skill in the art would be capable of applying the principles of the present invention to such implementations. Further, embodiments applying the principles of the present invention to such implementations would fall within the scope of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for detecting sensitive personal information in a storage device, the method comprising:
processing a block delta list, wherein said block delta list is a list of changed blocks in a storage device, wherein said block delta list includes deltas associated with said changed blocks that indicate differences in said changed blocks from a first point of time to a second point of time;
identifying changed blocks from said block delta list;
searching said identified changed blocks for sensitive personal information using a character scanning technique;
identifying a changed block deemed to contain said sensitive personal information; and
translating said identified changed block from a block level to a file level using a hierarchical reverse mapping technique.

2. The method as recited in claim 1 further comprising: conducting an initial scan of blocks in said storage device.

3. The method as recited in claim 2 further comprising:
identifying any changed blocks in said storage device, wherein a block is a contiguous set of bits or bytes that forms an identifiable unit of data, wherein a changed block is said block with an identifiable unit of data that has changed over a period of time, wherein said block is changed due to a storing of sensitive information.

4. The method as recited in claim 3 further comprising:
adding said identified changed blocks to said block delta list.

5. The method as recited in claim 1, wherein said hierarchical reverse mapping technique uses block level translations and file system inode translations.

6. The method as recited in claim 1, wherein said character scanning technique comprises a convolutional neural network, a recurrent neural network or a regular expression.

7. The method as recited in claim 1, wherein said identified changed block is translated from said block level to said file level using said hierarchical reverse mapping technique in response to said sensitive personal information being located in a middle of said identified changed block.

8. A computer program product for detecting sensitive personal information in a storage device, the computer program product comprising one or more computer readable storage mediums having program code embodied therewith, the program code comprising the programming instructions for:
processing a block delta list, wherein said block delta list is a list of changed blocks in a storage device, wherein said block delta list includes deltas associated with said changed blocks that indicate differences in said changed blocks from a first point of time to a second point of time;
identifying changed blocks from said block delta list;
searching said identified changed blocks for sensitive personal information using a character scanning technique;
identifying a changed block deemed to contain said sensitive personal information; and
translating said identified changed block from a block level to a file level using a hierarchical reverse mapping technique.

9. The computer program product as recited in claim 8, wherein the program code further comprises the programming instructions for:
conducting an initial scan of blocks in said storage device.

10. The computer program product as recited in claim 9, wherein the program code further comprises the programming instructions for:
identifying any changed blocks in said storage device, wherein a block is a contiguous set of bits or bytes that forms an identifiable unit of data, wherein a changed block is said block with an identifiable unit of data that has changed over a period of time, wherein said block is changed due to a storing of sensitive information.

11. The computer program product as recited in claim 10, wherein the program code further comprises the programming instructions for:
adding said identified changed blocks to said block delta list.

12. The computer program product as recited in claim 8, wherein said hierarchical reverse mapping technique uses block level translations and file system inode translations.

13. The computer program product as recited in claim 8, wherein said character scanning technique comprises a convolutional neural network, a recurrent neural network or a regular expression.

14. The computer program product as recited in claim 8, wherein said identified changed block is translated from said block level to said file level using said hierarchical reverse mapping technique in response to said sensitive personal information being located in a middle of said identified changed block.

15. A system, comprising:
a memory for storing a computer program for detecting sensitive personal information in a storage device; and
a processor connected to said memory, wherein said processor is configured to execute the program instructions of the computer program comprising:
processing a block delta list, wherein said block delta list is a list of changed blocks in a storage device, wherein said block delta list includes deltas associated with said changed blocks that indicate differences in said changed blocks from a first point of time to a second point of time;
identifying changed blocks from said block delta list;
searching said identified changed blocks for sensitive personal information using a character scanning technique;
identifying a changed block deemed to contain said sensitive personal information; and
translating said identified changed block from a block level to a file level using a hierarchical reverse mapping technique.

16. The system as recited in claim 15, wherein the program instructions of the computer program further comprise:
conducting an initial scan of blocks in said storage device.

17. The system as recited in claim 16, wherein the program instructions of the computer program further comprise:
identifying any changed blocks in said storage device, wherein a block is a contiguous set of bits or bytes that forms an identifiable unit of data, wherein a changed block is said block with an identifiable unit of data that has changed over a period of time, wherein said block is changed due to a storing of sensitive information.

18. The system as recited in claim 17, wherein the program instructions of the computer program further comprise:
adding said identified changed blocks to said block delta list.

19. The system as recited in claim 15, wherein said hierarchical reverse mapping technique uses block level translations and file system inode translations.

20. The system as recited in claim 15, wherein said character scanning technique comprises a convolutional neural network, a recurrent neural network or a regular expression, to said block delta list.

* * * * *